Figure 1:
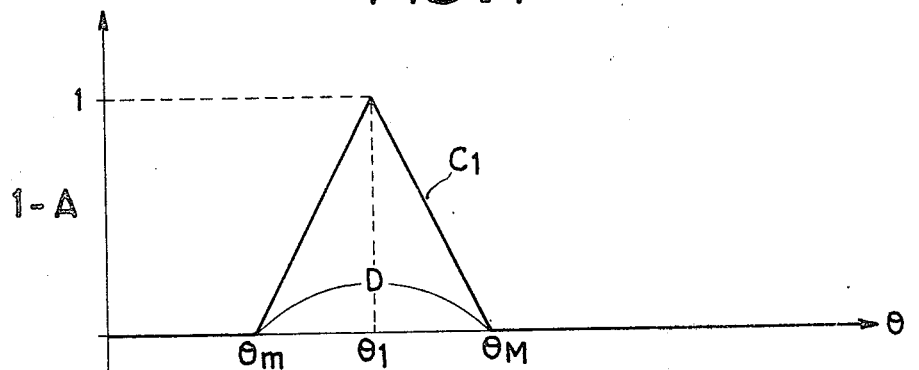
Figure 1:
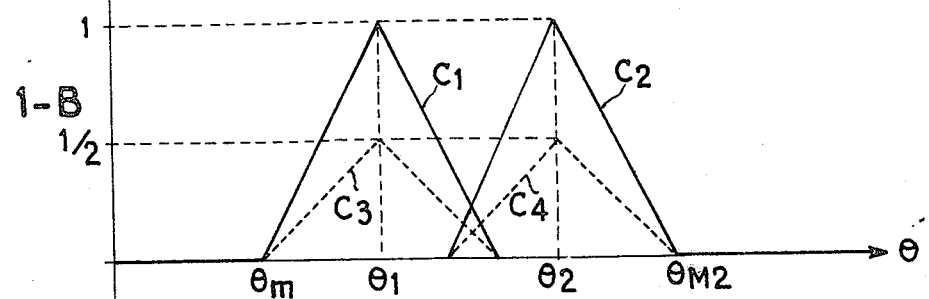
Figure 1:
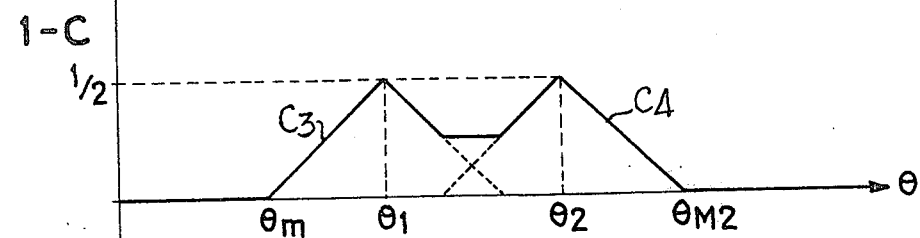
Figure 1:
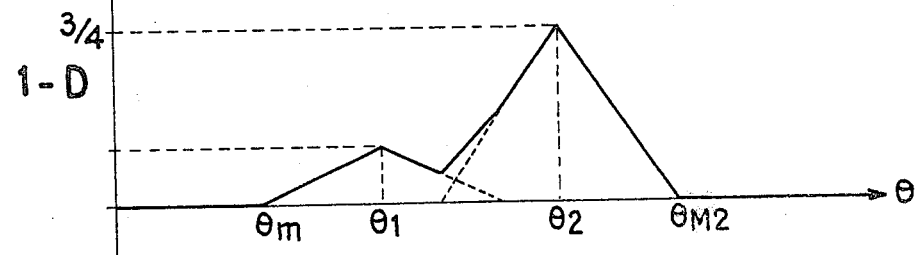

United States Patent [19]

Meriaux et al.

[11] 3,906,213
[45] Sept. 16, 1975

[54] CORRELATION SYSTEM FOR DELAY MEASUREMENT

[75] Inventors: Claude Meriaux; Jacques Aime, both of Paris, France

[73] Assignee: Thomson-CSF, Paris, France

[22] Filed: Mar. 21, 1974

[21] Appl. No.: 453,636

[30] Foreign Application Priority Data
Mar. 27, 1973 France .............................. 73.10945

[52] U.S. Cl. ......... 235/181; 235/150.53; 324/77 H; 343/100 CL
[51] Int. Cl.[2] ........................ G06G 7/19; G01S 9/12
[58] Field of Search ...................... 235/181, 150.53; 343/100 CL, 112 R; 329/79 D, 77 G, 77 H

[56] References Cited
UNITED STATES PATENTS

| | | | |
|---|---|---|---|
| 3,208,065 | 9/1965 | Gutleber et al. .................... | 235/181 |
| 3,514,585 | 5/1970 | Norsworthy ........................ | 235/181 |
| 3,638,025 | 1/1972 | Dishington et al. ................. | 235/181 |
| 3,641,447 | 2/1972 | Gaines et al. ..................... | 324/79 D |
| 3,689,750 | 9/1972 | Esser................................ | 235/181 |
| 3,812,493 | 5/1974 | Afendykiw et al. ................ | 343/112 R |

OTHER PUBLICATIONS

Talamini et al., New Target for Radar: Sharper Vision with Optics, Electronics, Dec. 27, 1965, pp. 58–66.
Gatland et al., A Correlation Function Computer Using Delta Modulation Techniques, J. Scientific Instrum. Vol. 42, No. 8, pp. 529–532, August 1965.

*Primary Examiner*—Felix D. Gruber
*Attorney, Agent, or Firm*—Cushman, Darby & Cushman

[57] ABSTRACT

A correlation system intended for delay measurement between two signals on a determined delay measurement zone, in which a correlator receives a reference signal and a reception signal provided from a transmitted original signal. The reference signal is provided from a plurality of $n$ signals corresponding to the original signal delayed by $n$ separate determined delay values and by selecting successively said $n$ delayed signals during $n$ respective determined periods of time, the sum of which being at most equal to the integration duration of the correlator.

7 Claims, 6 Drawing Figures

1-A

1-B

1-C

1-D

CORRELATION SYSTEM FOR DELAY MEASUREMENT

The present invention relates to a correlation system for delay measurement between two signals in a determined delay measurement zone. The invention finds particular application in a system in which there is measured the distance between a radar system and a detected target.

The measurement which can be made of the delay between two signals by using correlation techniques becomes more accurate the more nearly the main lobe of the correlation function is in the form of a high, sharp peak almost without secondary lobes. This result is achieved, or at least approximated to a sufficient degree, by using signals of the recurrent pulse type, these pulses being preferably coded using so-called Barker binary codes or pseudo-random codes.

Accuracy is even further increased by using known techniques which call for correlation functions to be overlapped in order to define several narrow measurement zones, the validation being obtained by selecting the correlation signal of greater amplitude or if the delay is situated in a common correlation area.

In general terms, a correlation circuit on its own allows one measurement zones to be defined and at least as many correlation circuits are used as there are separate zones to be checked. In the case of a radar system, the range zone over which surveillance is kept may be divided into successive elementary zones to which correspond the same number of correlation channels, each of which contains at least one correlation circuit. In such systems, each correlation circuit receives a reference signal which has a constant, predetermined amount of delay relative to the time origin used to measure the lags. In the case of a radar, the reference signal corresponds to the transmission signal after is has been delayed, the time origin being the initial time of transmission. The signal to be correlated which is the reception signal, forms the second signal applied to the correlator. The result of the correlation is a maximum where the lag between the two signals is zero.

Each correlation circuit is, in effect, assigned a specific delay value, which corresponds to the delay of the applied reference signal and which is situated at the center of the measuring zone of the correlator in question. The useful part of the correlation function, that is to say the "correlation peak" presents generally a symmetrical variation with respect to this central value of lag.

To widen the useful measuring zone and/or to increase the accuracy of measurement, known techniques are used to multiply the number of channels or correlation circuits while assigning each of them to a different delay.

An increase in the number of correlation circuits exerts an influence on the complexity, reliability, compactness and cost of the equipment.

A correlation system of the type with which the invention is concerned enables production of the measurement functions of a plurality of correlation circuits from only one correlator circuit, it being understood that performance is still at a specific level sufficiently high for satisfactory operation.

According to the invention, there is provided a correlation system for delay measurements between two signals in a determined delay measurement zone comprising, generating means for providing an original signal and a reference signal; means for transmitting said original signal; means for receiving said transmitted original signal and delivering a corresponding reception signal; correlating means for providing said delay measurement by correlating said reception signal with said reference signal; and utilization means fed by said correlating means and comprising threshold comparison means; said generating means comprising means for providing a plurality $n$ of signals corresponding to said original signal delayed by $n$ separate determined delay values respectively, and means for selecting in succession said $n$ delayed signals during $n$ respective determined durations the sum of which being at most equal to the duration of the original signal, said selection means delivering said reference signal formed by said $n$ successively selected delayed signals.

Figure 2:
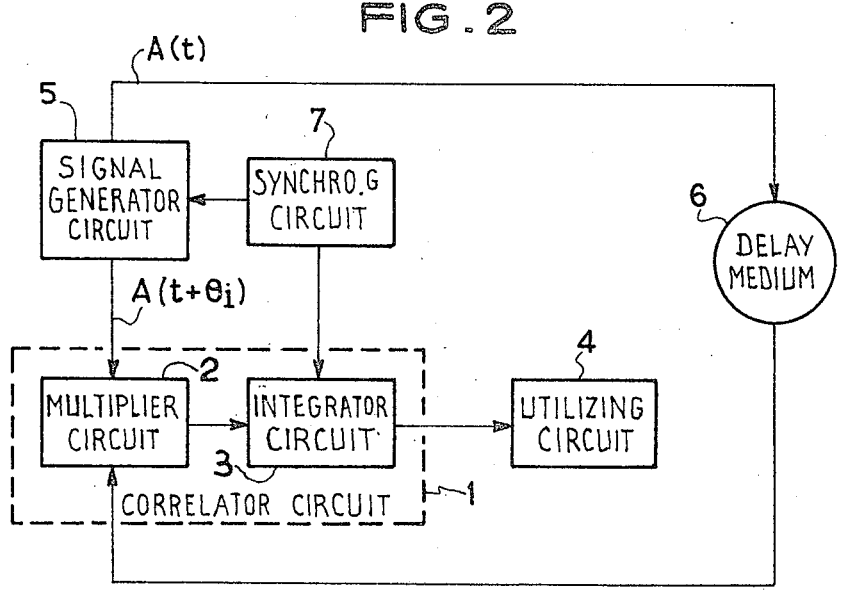
Figure 4:
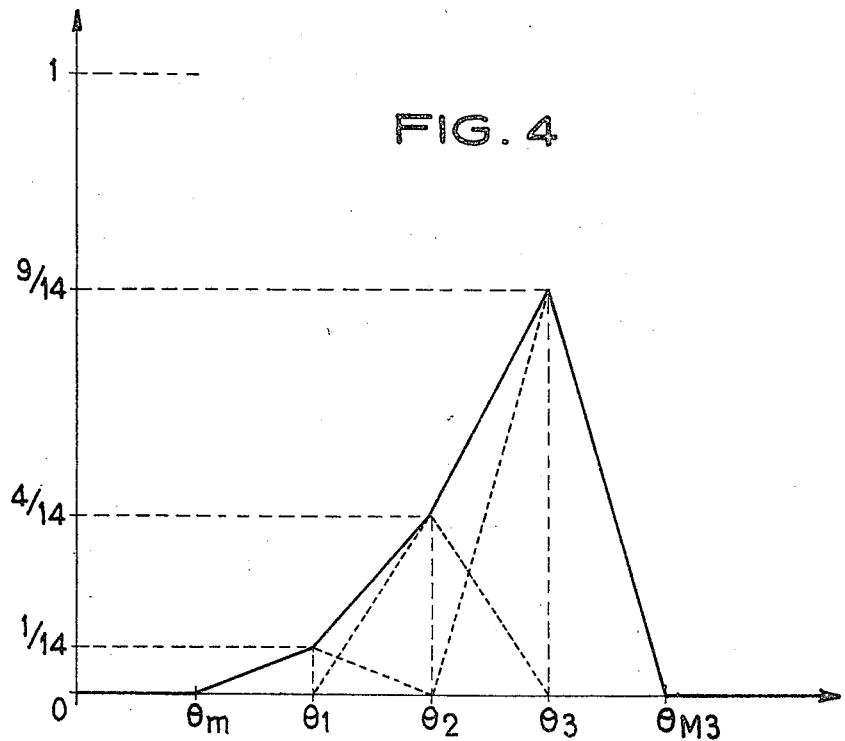
Figure 3:
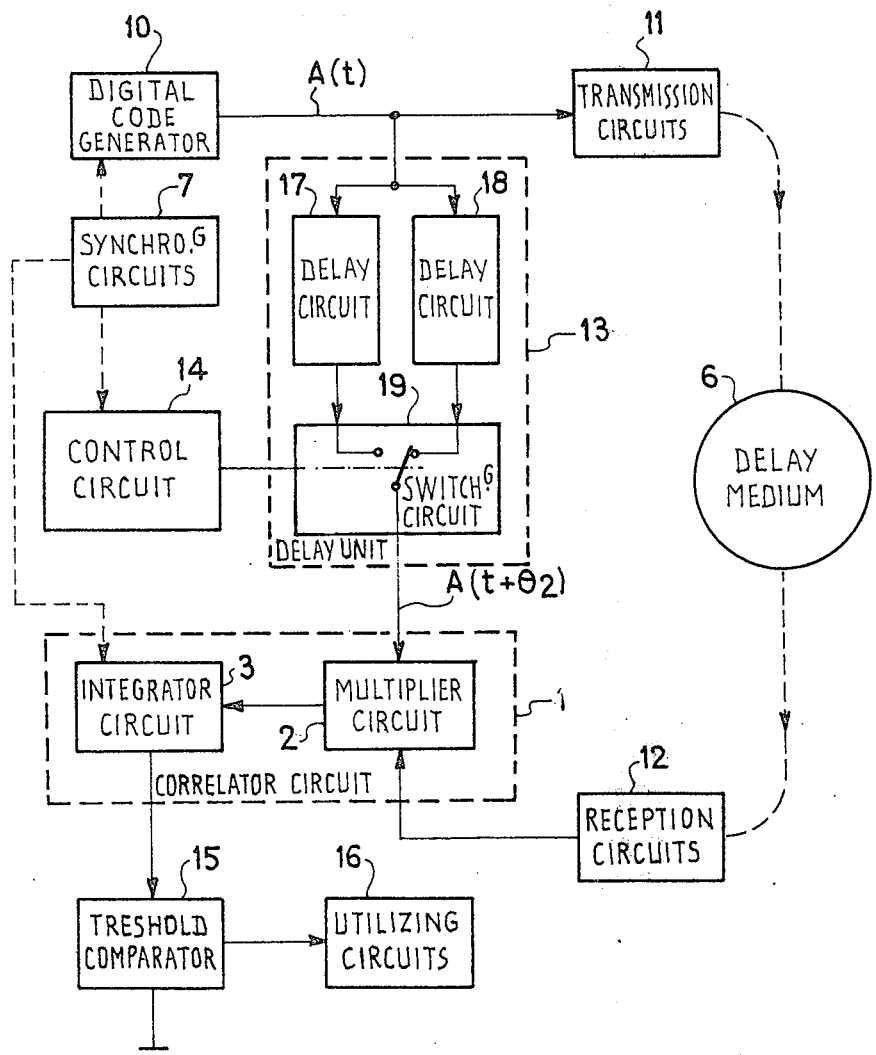
Figure 5:
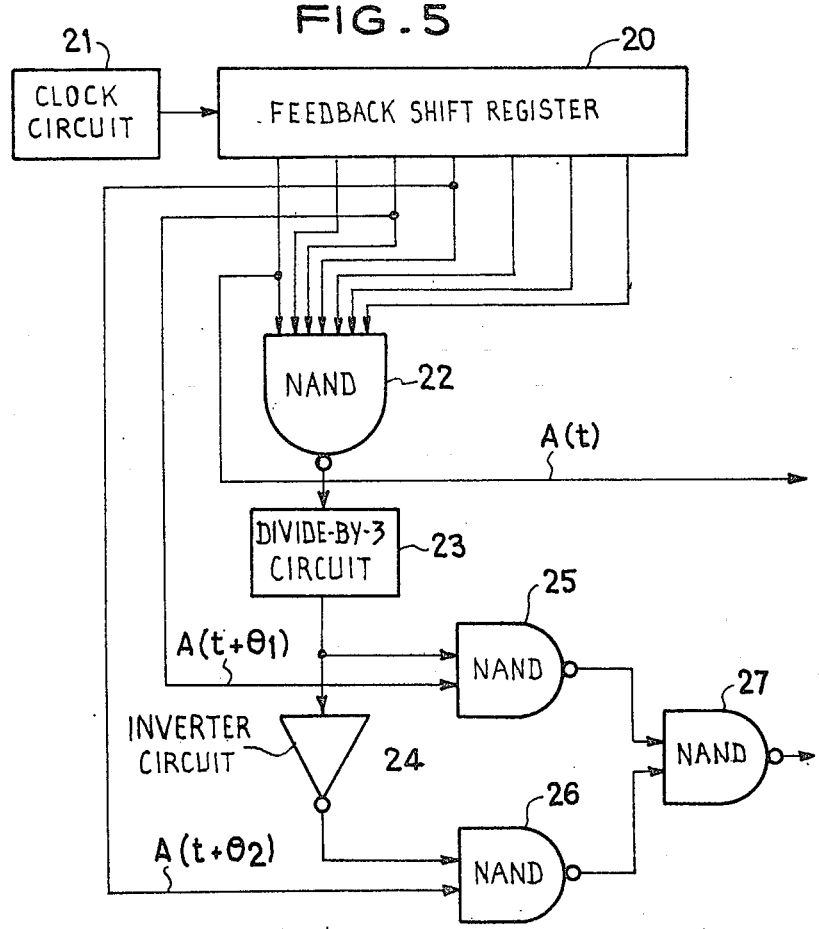
Figure 6:
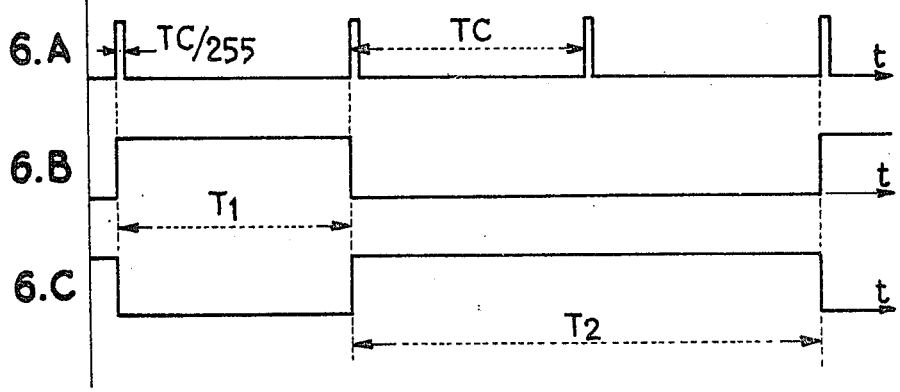

The invention will now be further described with reference to the accompanying drawings in which similar components are given with similar reference numerals and which show:

FIG. 1, graphs of correlation functions which illustrate the method utilized;

FIG. 2, a schematic block diagram of a correlation system according to the invention;

FIG. 3, a block diagram of a radar system utilizing a correlation system according to the FIG. 2;

FIG. 4, an example of a correlation function obtained;

FIG. 5, an embodiment of circuits for generating reference signals; and,

FIG. 6, wave forms relating to the operation of the generating circuits in FIG. 5.

Correlation enables the degree of resemblance or similarity between two functions of a same parameter to be measured, the parameter most frequently being a variable time $t$. The number measured called the correlation coefficient gives the point-by-point resemblance between these two functions in a precisely defined relative situation. To calculate the coefficient, it is merely necessary to calculate the product of these two functions, to integrate the product within predetermined limits, and then to average the result, which will then correspond to the mean product. The variation of this coefficient shows the variation of the degree of similarity and is obtained by introducing a new parameter which in general is a time shift or a delay.

If the functions to be correlated are $A(t)$ and $B(t)$, the correlation coefficient is $\overline{A(t) \cdot B(t)}$. If $\theta 1$ is the delay envisaged for $A(t)$ with respect to a predetermined time origin which is assumed to be equal to 0, and $\theta$ is the unknown inherent delay of $B(t)$ with respect to this origin, this coefficient becomes $\overline{A(t + \theta 1) \cdot B(t + \theta)}$.

What is measured is the time delay between two signals, and the conditions are generally assumed to correspond to autocorrelation, with the so-called reference signal $A(t + \theta 1)$, which corresponds to the first function, being identical to, or at least present in the reception signal which forms the second function, except for the difference between time delays $\theta 1$ and $\theta$. In addition, the correlation is preferably carried out using squarewave code signals of the pulse type. This being so, the autocorrelation function generally takes the form of a triangle C1 as shown in FIG. 1-A. The function is at a maximum where there is no lag ($\theta = \theta 1$), is symmetrical on either side of $\theta 1$, and is zero outside the triangle, the base of which defines a measuring area D in which delays comprised between a minimum value $\theta m$ and a maximum value $\theta M$ are measured.

FIG. 1-B shows the autocorrelation function obtained for two separate central values $\theta 1$ and $\theta 2$ of the reference signal, these being triangles C1 and C2 respectively, where the periods of integration are the same. The area of measurement is widened from $\theta m$ to $\theta M2$. By reducing the period of integration by half, the maximum height of triangles C1 and C2 is reduced in the same ratio and the corresponding autocorrelation functions are then represented by triangles C3 and C4 which cover the same area of measurement from $\theta m$ to $\theta M2$.

In accordance with the invention the reference signal transmitted to a same correlation device is affected by different predetermined delays $\theta 1$, $\theta 2$, etc . . . in temporal succession. In the case of the simple example envisaged in FIG. 1-B, the resulting autocorrelation function obtained with a single correlator is shown in FIG. 1-C.

In general terms, $\theta 1$, $\theta 2$ . . . $\theta i$ . . . $\theta n$ represent the n different successive delay values envisaged for the reference signal so as to cover a specific measurement zone, and $T1$, $T2$ . . . $Ti$ . . . $Tn$, represent the respective successive periods during which these delays are applied. The integration period is determined generally at least equal to the duration of the signal to be correlated. If T represents this minimum period of time during which integration takes place, the periods of application are calculated such that their sum TS constituted by $T1 + T2 + \ldots i + \ldots Tn$, is equal to, or less than the value T. In particular, when the sum TS is made less than the value T, the reference signal having successive delays $\theta 1$ to $\theta n$ is reproduced cyclically. In relation to the standard value 1 shown in FIG. 1-A and considered for a period of integration equal to T, the amplitudes of the various correlation triangles are reduced in the respective ratios $(Ti/T)$ (where $TS = T$) or $K(Ti/T)$ (where $TS = (T/K)$, taking the period of integration as T. If, for example, $Ti = (TS/2)$, the maximum amplitude becomes ½ for the corresponding correlation triangle (C3, FIG. 1-B). The amplitudes in question are the same if the application periods are the same, as is shown in the example in FIG. 1-C where $T1 = T2 = (TS/2)$; they are different if the application periods are not the same, as is shown in the example in FIG. 1-D, where it is assumed that $T1 = (TS/4)$ and $T2 = (3TS/4)$.

FIG. 2 shows a simplified diagram of a correlation system for making delay measurements by correlation with a reference signal having a variable delay. It comprises a correlation circuit 1 which combines a multiplier circuit 2 followed by an integrator circuit 3. The output of circuit 1 is connected to utilization circuit 4. Block 5 symbolises generator circuits which allow the original signal A (T) which is transmitted through a delay member or medium 6 and a reference signal A ($t + \theta i$) intended for the multiplier circuit 2 in the correlation circuit 1 to be produced. To this end, the generator circuits 5 incorporate means for producing the various delays $\theta 1$ to $\theta n$ to be applied to the reference signal as well as means for selecting these delays in succession, one after the other, during the periods of application T1 to Tn envisaged in the respective cases. The delay values may be chosen so as to present a progressive variation, increasing or decreasing, from $\theta 1$ to $\theta n$. The selection may be made by means of switching means. Block 7 symbolises synchronising circuits which, by controlling the transmission of signal A ($t$), enable a time origin to be defined for measurement purposes, and which also control the selecting or switching means. Where transmission is periodic, the synchronising circuits 7 may also control the integrator circuit 3 in order to ensure that the integration result is fed out at the end of each integrating period T and that the circuit is reset to its initial state at the beginning of each measurement cycle.

Signal A ($t$) may be repeated periodically at a repetition frequency equal to or greater than its own duration. In such cases, the integration period may cover several repetition periods and the application periods T1 to T$n$ are preferably so calculated that, if T$j$ is the shortest of these periods the sum of the periods T$j$ which occur during an integration period for the corresponding portion of reference signal having the delay $\theta j$, is of at least equal length to, or repetition period of, signal A ($t$).

The product function operation is carried out in the multiplier circuit 2 and the integration with standardised result operation is carried out in integrator circuit 3. The mean product correlation coefficient is transmitted from the output of the correlation circuit to utilization circuit 4.

The correlation system described, which operates by assigning different successive delays to the reference signal, is particularly applicable to the field of electromagnetic detection where radar systems are used.

In correlation radar systems, the transmission signals are generally formed either by recurring pulses or by recurring pulses which are phase-modulated using a digital code, or by a continuous wave which is phase-modulated using such a code. The reception signal, except for its delay and any possible noise and Doppler effect, is a replica of the reference signal. These signals allow a triangular shaped autocorrelation function to be obtained. The integrator circuit 3 may, for example, consist of a filter circuit followed by a detection and integration circuit.

FIG. 3 is schematic diagram of a radar system using a correlation system according to the FIG. 2. Components which are the same as those in FIG. 2 are given the same reference numerals; the other components comprise a digital code generator 10, transmission circuits 11 and reception circuits 12, a delay unit 13 controlled by a circuit 14 and code generator 10 which performs the function of signal generator 5 of FIG. 2. At the output of correlator 1, a threshold comparison circuit 15 comprises part of utilizing circuit of FIG. 2. The delay medium 6 is formed by air. For the purpose of explanation, the number of delays used is two, with a first delay circuit 17 in delay unit 13 producing a delay $\theta 1$ and a second delay circuit 18 producing a delay $\theta 2$. A switching circuit 19 enables the output of one or other of the two delay circuits 17 and 18 to be selected at any given time. Circuit 19 is controlled by a circuit 14 so as to make the successive switched connections required during the respective times T1 and T2 envisaged.

Alternatively circuit 10 may consist of a feedback shift register. In this case, it allows the various signals A ($t$), A($t + \theta 1$), A ($t + \theta 2$) to be supplied at separate outputs by making delays $\theta 1$ and $\theta 2$ of an appropriate size, and the delay circuits 17 and 18 may be then be dispensed with. Control circuit 14 is synchronised by circuit 7 and produces the signals for controlling the switching circuit 19. Circuits 14 and 19 may be produced from simple logic circuits using known techniques. It is understood that the different delays may equally well be produced by connecting delay members in series or by combining series and/or parallel connections by switching processes.

The shape of the autocorrelation function is well defined and the power received from a target having a given equivalent surface area varies $1/d^4$, $d$ being the distance. Thus, when detection is taking place at short distance, the very rapid alteration of the received power distorts the autocorrelation function and displaces the maximum detection sensitivity towards the closer distances in the range spread defined by the correlation.

Consequently, the radar system becomes capable of detecting targets having increasingly small surface areas, and this may constitute a drawback in certain applications. In order to allow for the alteration in sensitivity as a function of distance, a plurality of correlation channels assigned to different respective detection thresholds may be used for example. The invention enables this problem to be solved in a simple way by using one correlation channel to which different delays are switched for respective lengths of time which are also different.

By way of example, FIG. 4 shows a correlation function obtained with three regularly spaced delays $\theta 1$, $\theta 2 = \theta 1 + (\theta 1 - \theta m)$ and $\theta 3 = \theta 2 + (\theta 1 - \theta m)$ and respective periods of application T1, T2 = 4 T1 and T3 = 9 T1. The various values $\theta i$, T$i$ are so calculated that the resulting correlation function (FIG. 4) makes it possible to compensate for the variation in sensitivity prevailing in the detection area $\theta m$ to $\theta M3$ in question.

By way of example, FIG. 5 shows a circuit for generating signals A ($t$), A ($t + \theta 1$) and A ($t + \theta 2$). It contains a feedback shift register 20 which has 8 stages and produces a pseudorandom code of 255 digits. A clock circuit 21 is responsible for synchronisation. A complemented AND circuit 22, also known as a NAND circuit, is connected to seven consecutive outputs of the register and supplies the periodic signal shown in FIG. 6-A the period Tc thereof being equal to the length of the code. A divide-by-3 circuit 23 produces signal 6-B which, when applied to inverter circuit 24 forms signal 6-C. The outputs of register 20 which correspond to delays $\theta 1$ and $\theta 2$ are applied, together with signals 6-B and 6-C respectively, to two NAND circuits 25 and 26 which are followed by a third NAND circuit 27. One of the outputs of the register supplies transmission signal A ($t$) directly. Signal A ($t + \theta 1$) is delivered via circuits 25 and 27 for a length of time T1 equal to that Tc of the code at a repetition period equal to three times the value Tc. At other times, signal A (T + $\theta 2$) is supplied via circuits 24, 26 and 27 for a length of time T2 equal to twice that Tc of the code and with the same repetition period 3Tc.

It is understood that the invention is not limited to signals of an electrical nature and that a system according to the invention may incorporate a plurality of correlation systems at least one of which operates with a variable delay reference signal.

The invention may be applied to other systems and in particular to altimetric systems and to interferometry systems.

Of course the invention is not limited to the embodiment described and shown which was given solely by way of example.

What is claimed is:

1. A correlation system for delay measurements between two signals in a determined delay measurement zone comprising, generating means for providing an original signal and reference signals; means for transmitting said original signal through a delay medium; means for receiving said transmitted original signal and for delivering a corresponding reception signal; correlating means for correlating during a determined integration duration said reception signal with said reference signals; and utilization means fed by said correlating means and comprising threshold comparison means; said generating means comprising delay means for providing a plurality $n$ of signals corresponding to said original signal delayed by $n$ separate determined delay values respectively, and selection means for selecting in succession said $n$ delayed signals during $n$ respective determined separate durations the sum of which being at most equal to the said integration duration, said selection means delivering said reference signals formed by said $n$ successively selected delayed signals.

2. A correlation system according to claim 1, wherein said generating means comprises feedback shift register means to provide an original signal which presents a triangular autocorrelation function.

3. A correlation system according to claim 2, wherein said $n$ separate delay values are determined such that the corresponding autocorrelation functions overlap two by two successively in said determined range of delay measurement and said delay values are provided at separate outputs of the said feedback shift register means.

4. A correlation system according to claim 1, wherein said selection means comprises a set of logic circuits associated with the said feedback shift register means to select said $n$ delayed original signals successively according to a progressive variation of said delay values and cyclically with a repetition period equal to said sum duration.

5. A correlation system according to claim 1, wherein said generating means comprise a generating circuit delivering said original signal, a plurality of $n$ of delay circuits fed simultaneously by said original signal and connected by their respective outputs to a switching circuit, and a synchronising circuit for controlling said generating circuit and said switching circuit.

6. A correlation system according to claim 3, wherein said generating means comprise a feedback shift register having at least $n + 1$ stages to provide at one stage output a pseudo-random code signal constituting said original signal and at $n$ other stage outputs said $n$ delayed original signals respectively, said signals being applied to a said set of logic circuits for producing said reference signal, and a synchronising circuit for controlling said register.

7. A correlation system according to claim 3 and intended for short range radar detection, wherein said $n$ respective durations are successively increasing such that the amplitude variation of said functions makes it possible to compensate for the sensivity variation prevailing in the aera in question.

* * * * *